UNITED STATES PATENT OFFICE.

HENRY WURTZ, OF NEW YORK, N. Y.

IMPROVEMENT IN THE MANUFACTURE OF CEMENTS, MASTICS, AND JAPANS FROM GRAHAMITE.

Specification forming part of Letters Patent No. 67,696, dated August 13, 1867.

*To all whom it may concern:*

Be it known that I, HENRY WURTZ, of New York, in the county of New York, in the State of New York, have invented a new and Improved Mode of Making Compositions for Cements, for Mastics, and for Japanning and Enameling, which withstand the sun, air, water, acids, alkalies, alcohol, &c., and insulate electrically; and I do hereby declare that the following is a full and exact description thereof.

The nature of my invention consists in applying to the surfaces which are to be cemented or coated, previously compounded with other materials, a certain mineral substance found forming a dike or vein in Ritchie county, West Virginia, (known sometimes as "Ritchie coal," "crystallized petroleum," &c., but) which I call "grahamite."

In order to enable those skilled in the several arts to which it is applicable to practice and make use of my invention, I shall proceed to describe my methods of operation and proceeding.

(a.) *Preparation of Grahamite Cements.*

The raw grahamite being of too infusible and frangible a nature to be used alone as a cement, or for most of the other uses above specified, it is necessary, in order to utilize in this way the extraordinary powers of resistance to heat, electricity, and chemical agents which I have discovered this mineral to possess, to combine it previously with some other material which will increase its fusibility and cohesion. I use for this purpose any material of a tarry, resinous, balsamic, pitchy, or asphaltic nature, mixing such material ordinarily in about equal proportions, or thereabout, by weight, with the pulverized grahamite, and then applying heat, with constant stirring for an hour or more, or until the incorporation is complete and the mass homogeneous.

The material which I usually prefer for this purpose is common crude turpentine, in the proportion of 100 of grahamite to 150 or more of turpentine, with which a composition is produced in the highest degree suitable for a sealing-wax for all the various purposes to which the latter is applicable, one of these being a bottle-wax or bottle-cement of the highest value for confining acid, alkaline, or alcoholic liquids, and which will not liquefy in a warm climate or locality. Agreeable odors may be imparted to such compositions in various obvious ways. I am accustomed to add small quantities of a fragrant balsam or resin, such as storax, gum-benzoin, some variety of frankincense, &c.

Very cheap compositions of this class I have made by combining with the grahamite, in the manner above set forth, common coal or gas tar, the tar formed in its own distillation, petroleum tars, and still-bottoms, and other varieties of tars unnecessary to particularize. Rosin, pitch, asphaltum, common roofing-cement, &c., may also be added; or the fusibility and other qualities of these materials may be modified by fusion with a proportion of grahamite.

(b.) *Uses of the Grahamite Cements.*

I have found these cements and compositions, by reason of the peculiar and exceptional qualities of grahamite, to be especially applicable to the following uses, to wit:

1. As sealing-wax, bottle-cement, &c., as above stated. In the preparation of sealing-wax, for most purposes, I generally proceed as follows: One hundred parts of powdered grahamite are intimately mixed by stirring with one hundred and fifty parts of hot crude turpentine. The mixture is at first quite fluid when hot; but on continuation of the heat it gradually becomes thicker and thicker. The completion of the combination is indicated when the fused mixture will draw out into long, fine, translucent threads, like the best quality of sealing-wax. The heat must not be sufficiently high to volatilize any considerable portion of the turpentine. When a bottle-cement is wanted, a part or the whole of the turpentine may be replaced by coal-tar; and, unless the preparation is to suffer exposure in very hot climates or localities, a somewhat larger proportion of turpentine or tar, to increase the fusibility, is admissible.

2. As materials for cementing the joints and coating the walls of reservoirs, tanks, cisterns, sinks, and casks. Casks and barrels, more especially, are thus fitted, in the highest degree, for containing spirituous and fermented liquors, sirups and molasses, vinegars, ammonia, and all other aqueous fluids, either acid, alkaline, or neutral.

3. For making all varieties of mastics and concretes for roofing purposes, either alone or in admixture with sand, gravel, clay, lime, plaster, &c.; for building and paving purposes in similar forms of admixture; also, in like compositions for making water-pipes, aqueducts, drain-pipes, &c.; also, as materials for coating and waterproofing bricks and other porous materials for the like uses.

4. For coating and saturating canvas for tents, water-proof blankets, tarpaulins, &c.; also, paper and felt to be used for roofing, and for making pipes for conveying water and other liquids.

5. As superior substitutes for pitch in pitching and calking boats and ships, particularly in hot climates.

6. For the japanning and enameling of iron and other metals, as for sheet-metal roofing, stove-pipes, kettles, and various cooking and household utensils, boilers, &c. For applying such cements in thin layers to metals for the latter uses I have used different methods. Either the pulverized cement may be brushed over the metallic surface in commixture with a suitable liquid, after the fashion of a paint, and subsequently united intimately with the surface by exposure to a gradually-increased heat, (taking care to avoid a high heat at first, which would tend to produce bubbles, and thus destroy the brilliancy of the surface;) or the composition may be formed upon the surface of the article itself by first applying thereto the mixture as a thin varnish, (or by applying first a varnish of tar or crude turpentine alone, then dusting over with powdered raw grahamite,) and then applying a slow and uniform heat till the cement has become fully united with the surface, and exhibits a brilliant reflection without emission of further smoke. It is scarcely necessary to add that a procedure similar to this last is applicable also to coating other materials than metals. It is advisable, of course, when tars (and especially coal-tars,) are used in such compositions for coating iron or other corrodible metals, to separate previously from the tar all ingredients of acid or other qualities which might be detrimental to that metal.

7. As materials for insulating electric and voltaic machines, batteries, conductors, wires, and apparatus generally. In voltaic batteries the resistance of grahamite to chemical agents co-operates with its high insulating power in giving value to these compositions. The same remark applies to the coating of wire and other electric conductors which are to be exposed to the action of air or water.

What I claim as my invention, and desire to secure by Letters Patent, is—

1. The conversion of the mineral above specified (called by me "grahamite") into compounds suitable for cements, for mastics, for japanning and enameling metallic and other surfaces, and for electrical insulation, by fusion or combination with any material of a tarry, pitchy, asphaltic, resinous, or balsamic nature, substantially as above set forth.

2. The use as cements and mastics, and for japanning, enameling, or coating surfaces, and for electric insulates, in any of the special cases above set forth as examples, or in any cases substantially similar, of the mineral grahamite, or any compound made by fusion or combination of grahamite with any material of a tarry, pitchy, asphaltic, resinous, or balsamic nature, all substantially as above set forth.

In testimony whereof I have hereunto signed my name in the presence of two witnesses, in the city of New York, this 9th day of July, 1867.

HENRY WURTZ.

Witnesses:
H. BENKMAN,
THO. G. WEST.